United States Patent
Garcia-Crespo et al.

(10) Patent No.: US 9,249,669 B2
(45) Date of Patent: Feb. 2, 2016

(54) CMC BLADE WITH PRESSURIZED INTERNAL CAVITY FOR EROSION CONTROL

(75) Inventors: Andres Garcia-Crespo, Greenville, SC (US); Jerome Walter Goike, Greenville, SC (US)

(73) Assignee: General Electric Company, Schenectady, NY (US)

( * ) Notice: Subject to any disclaimer, the term of this patent is extended or adjusted under 35 U.S.C. 154(b) by 838 days.

(21) Appl. No.: 13/439,892

(22) Filed: Apr. 5, 2012

(65) Prior Publication Data

US 2013/0330189 A1    Dec. 12, 2013

(51) Int. Cl.
   *B23P 15/02*    (2006.01)
   *F01D 5/18*    (2006.01)
   *F01D 5/14*    (2006.01)
   *F01D 21/00*    (2006.01)

(52) U.S. Cl.
   CPC ............... *F01D 5/181* (2013.01); *F01D 5/147* (2013.01); *F01D 5/18* (2013.01); *F01D 5/187* (2013.01); *F01D 21/003* (2013.01); *F05D 2300/6033* (2013.01); *Y02T 50/672* (2013.01); *Y02T 50/676* (2013.01); *Y10T 29/49337* (2015.01)

(58) Field of Classification Search
   CPC ........... F01D 5/181; F01D 5/18; F01D 5/147; F01D 5/187; F01D 21/003
   See application file for complete search history.

(56) References Cited

U.S. PATENT DOCUMENTS

| | | | |
|---|---|---|---|
| 4,710,102 A | 12/1987 | Ortolano | |
| 4,781,532 A | 11/1988 | Novacek et al. | |
| 4,840,539 A | 6/1989 | Bourcier et al. | |
| 4,916,715 A | 4/1990 | Adiutori | |
| 4,983,034 A | 1/1991 | Spillman, Jr. | |
| 5,100,292 A | 3/1992 | Matula et al. | |
| 5,174,720 A | 12/1992 | Gradl | |
| 5,211,540 A | 5/1993 | Evans | |
| 5,267,834 A | 12/1993 | Dinh et al. | |
| 5,299,915 A | 4/1994 | Dinh et al. | |
| 5,320,483 A | 6/1994 | Cunha et al. | |
| 5,382,453 A * | 1/1995 | Mason | 427/249.2 |
| 5,772,397 A | 6/1998 | Morris et al. | |
| 5,819,540 A | 10/1998 | Massarani | |

(Continued)

FOREIGN PATENT DOCUMENTS

WO    2007081347 A2    7/2007

OTHER PUBLICATIONS

Search Report and Written Opinion from EP Application No. 13153323.4 dated Apr. 12, 2013.

*Primary Examiner* — Dwayne J White
*Assistant Examiner* — Jason Fountain
(74) *Attorney, Agent, or Firm* — Nixon & Vanderhye P.C.

(57) ABSTRACT

A ceramic matrix composite blade for use in a gas turbine engine having an airfoil with leading and trailing edges and pressure and suction side surfaces, a blade shank secured to the lower end of each airfoil, one or more interior fluid cavities within the airfoil having inlet flow passages at the lower end which are in fluid communication with the blade shank, one or more passageways in the blade shank corresponding to each one of the interior fluid cavities and a fluid pump (or compressor) that provides pressurized fluid (nominally cool, dry air) to each one of the interior fluid cavities in each airfoil. The fluid (e.g., air) is sufficient in pressure and volume to maintain a minimum fluid flow to each of the interior fluid cavities in the event of a breach due to foreign object damage.

19 Claims, 6 Drawing Sheets

(56) References Cited

U.S. PATENT DOCUMENTS

| | | | |
|---|---|---|---|
| 6,062,811 A | 5/2000 | Zombo et al. | |
| 6,179,556 B1 | 1/2001 | Bunker | |
| 6,283,708 B1 | 9/2001 | Zelesky | |
| 6,299,412 B1 | 10/2001 | Wood et al. | |
| 6,382,913 B1 | 5/2002 | Lee et al. | |
| 6,390,775 B1 | 5/2002 | Paz | |
| 6,405,538 B1 * | 6/2002 | Akiyama | F01D 5/081 415/115 |
| 6,428,273 B1 | 8/2002 | Keith et al. | |
| 6,464,456 B2 | 10/2002 | Darolia et al. | |
| 6,508,620 B2 | 1/2003 | Sreekanth et al. | |
| 6,514,046 B1 | 2/2003 | Morrison et al. | |
| 6,520,020 B1 | 2/2003 | Lutz et al. | |
| 6,648,597 B1 | 11/2003 | Widrig et al. | |
| 6,709,230 B2 | 3/2004 | Morrison et al. | |
| 6,786,696 B2 * | 9/2004 | Herman et al. | 416/96 R |
| 6,805,533 B2 | 10/2004 | Schopf | |
| 6,838,157 B2 | 1/2005 | Subramanian | |
| 6,984,112 B2 | 1/2006 | Zhang et al. | |
| 7,412,320 B2 | 8/2008 | Brummet | |
| 8,452,189 B2 | 5/2013 | Schunk | |
| 2006/0263216 A1 | 11/2006 | Brummel | |
| 2010/0061859 A1 | 3/2010 | DeMania et al. | |
| 2011/0027098 A1 | 2/2011 | Noe et al. | |
| 2011/0138897 A1 | 6/2011 | Snow | |

* cited by examiner

CMC BLADE WITH PRESSURIZED INTERNAL CAVITY FOR EROSION CONTROL

This invention was made with Government support under Contract No. DE-FC26-05NT42643 awarded by the Department of Energy. The Government has certain rights in the invention.

The present invention relates to ceramic matrix composite ("CMC") blades for gas turbine engines used in the power generation and aircraft industries and, in particular, to a new form of CMC blade maintained under a fixed pressure to prevent the blade cavities from being compromised (which otherwise could lead to a catastrophic failure of the engine) due to foreign object damage occurring to the blades during extended periods of use.

BACKGROUND OF THE INVENTION

Over the years, the performance criteria of gas turbine engines has steadily increased with corresponding improvements in engine efficiency, better thrust-to-weight ratios, lower emissions and improved fuel consumption. However, gas turbine engine temperatures often reach or exceed the limits of the materials of construction, thereby comprising the structural integrity of components in the hot sections of the engine, particularly the gas turbine engine blades. Thus, as gas turbine operating temperatures have increased, various methods have been developed to help protect blades in both the rotor and turbine sections using, for example, high temperature alloys for the combustors and turbine blades. Initially, ceramic thermal barrier coatings ("TBCs") were applied to the surfaces of components exposed to the hot effluent combustion gases in order to reduce the heat transfer rate and provide thermal protection to the underlying metal and allow components. Such improvements helped to reduce the peak temperatures and thermal gradients of the base metal.

In more recent times, ceramic matrix composites ("CMCs") were developed as substitutes for many of the high temperature alloys used in conventional turbine engines. CMCs offered improved temperature capability and density advantages over metal blades, often making them the material of choice at the higher anticipated operating temperatures of newer generation turbine engines. A number of new manufacturing techniques have also been developed to produce better quality engine components, particularly the turbine blades, using CMC construction materials. For example, silicon carbide CMCs are now formed from fibrous material infiltrated with molten silicon, such as products made by the "Silcomp" process. Other techniques for forming CMC components include polymer infiltration and pyrolysis ("PIP") and the slurry cast melt infiltration ("MI") process. All such processes focus on improving the structural integrity of gas engine components without sacrificing engine performance.

The efforts to develop improved composite rotor blades, stator vanes and airfoils having high strength with elongated filaments composited in a light weight matrix continues to this day. One problem that has discouraged the introduction of new light weight composite gas turbine engine blades is their relative vulnerability to foreign object damage. Many types and sizes of foreign objects can become entrained in the inlet of a gas turbine engine, particularly aircraft engines, ranging from birds to hailstones, sand and dust particles. Turbine damage from foreign objects typically takes two forms. Smaller objects can erode the CMC blade material and eventually reduce the efficiency and degrade the performance of the engine. Any impact by larger objects can rupture or pierce the blades, and portions of an impacted blade can even be torn loose and cause extensive secondary damage to adjacent and downstream blades or other vital engine components. The consequences of foreign object damage appear to be greatest in the low pressure compressors of high bypass gas turbine engines.

Various design improvements have been attempted in an effort to prevent composite blade failures due to foreign objects, such as the inclusion of a protective leading edge blade strip which helps prevent a catastrophic blade failure while providing some erosion protection to the blade, particularly along the leading edge. The edge protection strips allow the energy of impact (due, for example, to a bird strike) to be transmitted down to the trailing edge of the blade. However, even the dissipation of the impact energy can cause the blade to locally oscillate and/or be displaced to a different amplitude, and ultimately fail. Any oscillations or large rapid displacements of the trailing edge also induce strains to the blade matrix which can exceed material system limits and create internal delamination and/or blade surface fracture. Objects impacting a blade can even lead to the loss of edge material and rotor imbalance which in turn limits engine speed and power.

Even though CMC materials are highly resistant to hot temperatures (much more than metals), water vapor in exhaust streams can cause rapid degradation of the matrix, and thus the materials must normally be coated with an environmental barrier coating ("EBC") in order to protect the underlying matrix from water vapor present in the combustion stream. Unfortunately, the use of thermal coatings on CMC components cannot prevent breaches to the turbine blade itself due to objects impacting against the blades during operation, particularly along the leading edge. Thus, if any penetration of the EBC occurs due to foreign object damage, or by other means such as thermo mechanical shock, the underlying CMC material faces accelerated degradation due to an increased exposure to any water in the hot gas path.

A significant design problem therefore remains in the gas turbine engine field with respect to the use of ceramic matrix composites in the hot gas path. Although adding a barrier coating (EBC) helps to seal the matrix and protect it from hot gas attack, the problem of foreign object damage remains, particularly impacts that penetrate the coating. As detailed below, a new form of ceramic matrix composite blade has been developed as a significant step change in improving the long-term reliability of both blade and engine performance.

BRIEF DESCRIPTION OF THE INVENTION

The present invention includes a new type of airfoil and CMC blade for use in a gas turbine engine having a design that ensures greater longevity, particularly in the event of damage to an airfoil caused by a foreign object impacting the blade. The invention provides a unique method of secondary blade protection by using dry, cool air to protect the structural integrity of the blade even after an initial penetration of the CMC matrix. As used herein, the term "cool" to describe the air used to pressurize and preserve the internal cavities of rotor blades means a supply of air at temperatures well below the normal temperature of the gas turbine exhaust and typically well below 900° F. As used herein, the term "blade" includes the airfoil portion, a blade shank, dovetail connection and blade platform.

The exemplary CMC blades described herein include a curved airfoil (sometimes referred to as a gas turbine "bucket") having leading and trailing edges and pressure and suction side surfaces, a blade shank secured to the lower end of the airfoil, one or more interior fluid cavities disposed within the airfoil such that each interior fluid cavity is sealed, an inlet fluid passage at the lower end in fluid communication with the blade shank, one or more fluid passageways formed in the blade shank corresponding to each one of the interior fluid cavities, and a fluid pump and/or compressor for continuously providing a source of pressurized fluid (nominally cool, dry air) to each one of the interior fluid cavities in each airfoil.

Significantly, the source of cool, dry air is sufficient in pressure and volume to maintain a minimum continuous air flow to each of the interior fluid cavities as described above in the event of a breach of one or more cavities due to foreign object impact or other damage. As such, the method according to the invention serves to extend the life of critical engine components, particularly the rotor blades, that may suffer from damage during operation that otherwise could result in a catastrophic engine failure.

The CMC blades according to the invention can be manufactured using a CMC matrix composite fabrication process known as a "hollow fashion." The blades are formed with at least one, and preferably multiple, integral interior sealed cavities, with each cavity having an opening at the lower end in the blade shank. The interior cavities extend substantially the entire length of the composite blade to form one or more integral blade chambers. Each blade also has an air entry passage that feeds directly into each of the respective blade cavities.

Unlike known prior art CMC matrix blade and metal designs, no exit air passage is provided from the blades, and thus the cavities do not allow for the flow of air into or through the cavities in the absence of foreign object damage. Instead, the blade becomes pressurized by a source of cool, dry air and remains pressurized and stable even after an initial breach. The pressure differential between the inner and outer sections of the blade will still be sufficient to ensure a continuous (and detectable) flow of air from a pressurized source into the blade cavities if any portion of the blade (particularly along the leading edge) becomes compromised due to penetration into one or more of the internal cavities due to an impact event on the blade. By having the cool air and dry air from the rotor cavity continuously discharged, the blade cavity is not compromised by the ingression of hot and moist combustion air originating from the turbine flow path. The air nominally is ported directly into the blade using an adapter piece and fluid openings in the blade shank. The system is also designed to accommodate and continuously control any leakage due to object impact in order to prevent further blade deterioration and/or a catastrophic failure of the blade or possibly the entire engine.

DETAILED DESCRIPTION OF THE INVENTION

Figure 1:
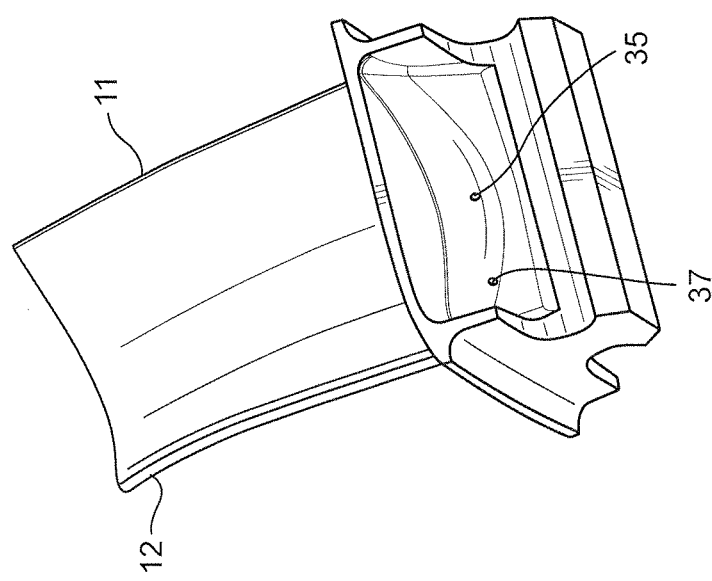
FIG. 1 is a perspective view of a CMC composite turbine blade having an exemplary integral interior blade cavity pressurization system according to a first embodiment of the invention (referred to herein as "bottom feed blade pressurization")

Referring to the figures, FIG. 1 depicts an exemplary embodiment of a CMC composite turbine blade having an integral interior blade cavity pressurization means according to the invention, referred to herein as "bottom feed blade pressurization." The curved blade (as used in many gas turbine engines) is depicted generally at 10 and includes a leading edge 11 and trailing edge 12. The "blade" includes the entire article comprising an airfoil portion 23 (which receives hot exhaust gas from the gas turbine engine), the blade shank 15, dovetail connection 14 and blade platform 16. The curved configuration of the blade provides for pressure and suction side surfaces of the airfoil extending between the leading and trailing edges. Exemplary airfoils can be produced by various CMC fabrication techniques which involve forming a preform of ceramic fiber (such as silicon carbide) in the desired shape by weaving or other known fabrication methods, and then infiltrating the preform with a matrix material. The preform can be coated for bonding with the matrix, e.g., using chemical vapor infiltration, slurry infiltration-sintering, slurry casting or melt infiltration.

Although the exemplary blade depicted in FIG. 1 could be used in a gas turbine engine, blade 10 can be configured for use in other blade assemblies such as a compressor or any other suitable fan blade application. The assembly includes one or more blades 10 formed from a ceramic matrix composite material, such as silicon carbide fibers embedded in a silicon carbide matrix ("SiC/SiC"). Blade 10 includes airfoil 23 against which the flow of hot exhaust gas is directed with the airfoil being mounted to a turbine wheel disk (not shown) by dovetail 14 extending downwardly from airfoil 23 and engaging a slot in a corresponding geometry of the gas turbine wheel disk. Dovetail 14 and the surfaces of airfoil 23 thereby form a concave intersection as shown. In other embodiments, blade 10 may include a geometry corresponding to other turbine applications.

In the embodiment of FIG. 1, the plurality of turbine blades 10 are secured to a turbine rotor wheel disk (not shown) by means of dovetail 14. See also FIG. 9. Typically, the blade airfoils or buckets extend a full 360 degrees about the turbine wheel forming an entire row of buckets. Each dovetail joint includes a shaped slot formed in the dovetail portion designed for mating and sliding engagement with a complementary dovetail shape formed on the rim of the rotor wheel. The buckets are designed to be added to the rotor wheel via a radial filling slot formed in the wheel rim, i.e., by moving a bucket radially into the slot and then sliding the bucket tangentially along the dovetail tang. This process is repeated until an entire row of buckets are mounted on the wheel. In the embodiment of blade 10 in FIG. 1, the entire CMC blade includes integral platform extending across the pressure side and the suction side of dovetail 14.

FIG. 1 also illustrates exemplary means for pressurizing the integral interior blade cavities in a first embodiment of the invention via fluid openings 17 and 18. This type of bottom feed pressurization can be achieved by introducing a continuous air stream (ultimately creating a steady state internal pressure condition) into each blade cavity through blade openings 17 and 18 (see also FIGS. 3 and 4). The two air feeds extend from the bottom edge of the blade dovetail up through blade shank 15 into the CMC cavities. As noted above, pressurized air nominally is provided by an external pressure system (see FIG. 8).

Figure 2:
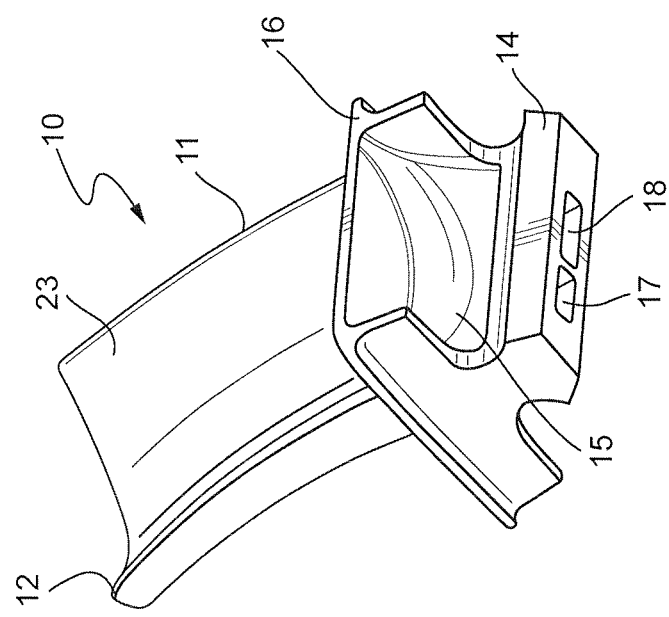
FIG. 2 is a perspective view of a CMC composite turbine blade having an alternative integral interior blade cavity pressurization system (referred to herein as "shank fed blade pressurization")

FIG. 2 is a perspective view of a CMC composite turbine blade having an alternative integral interior blade cavity pressurization system in a second embodiment as compared to FIG. 1. This shank-fed blade pressurization system provides a continuous air stream using separate internal feed passageways beginning in the blade shank and proceeding into the separate blade cavities as shown. Again, the air feed ultimately forms a steady state internal pressure condition in each blade cavity. However, in this embodiment the flow occurs via smaller blade air passageways 35 and 37. As in FIG. 1, the separate air feed lines extend from the bottom edge of the blade dovetail up through the blade shank into the separate CMC cavities. The pressurized air is again provided by an external air pressure system. The embodiment of FIG. 2 utilizes the same basic curved blade design with generally congruent interior cavities as in FIG. 1, with leading edge 11 and trailing edge 12.

Figure 3:
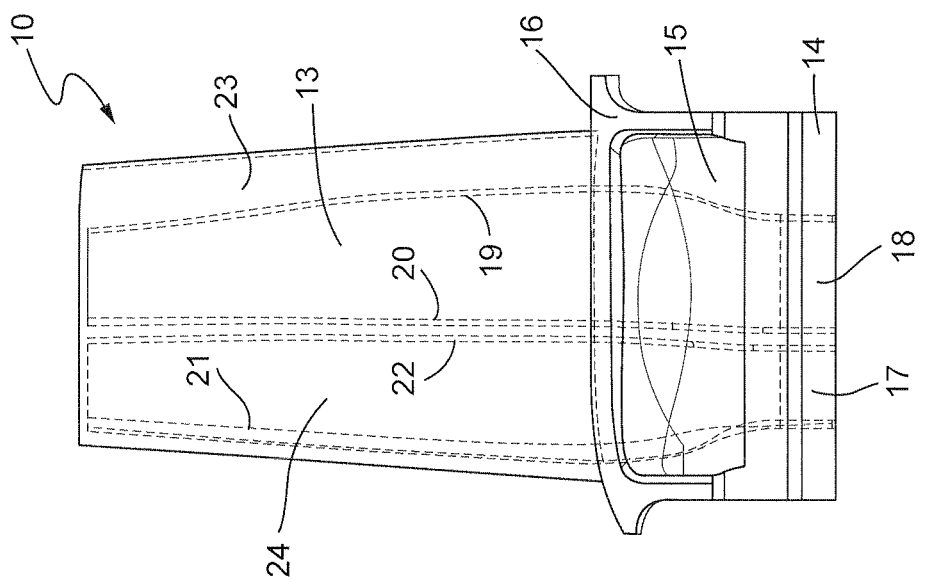
FIG. 3 is a front elevation view of the composite CMC turbine blade depicted in FIG. 1 further illustrating exemplary fluid passageways for achieving interior blade cavity pressurization according to the invention.

FIG. 3 is a front elevation view of the composite CMC turbine blade 10 depicted in FIG. 1 further illustrating the fluid passageways for achieving interior blade cavity pressurization according to the invention. This embodiment includes blade airfoil 23 and two interior blade cavities 13 and 24, with cavity 13 defined by interior side walls 19 and 20 and cavity 24 formed by side walls 21 and 22. Inlet fluid passages 17 and 18 feed pressurized air directly into the cavities via openings as shown. FIG. 3 also includes dovetail connection 14 and blade shank 15 described above in connection with FIG. 1. The embodiment of FIG. 3 does not include any exit air passage and thus, once pressurized, cavities 13 and 24 do not allow for the continuous flow of air into or through the cavities, and thus the blade remains at a relatively constant, steady-state pressure even if a minor breach occurs to the blade exterior due to impact with an external object.

Figure 4:
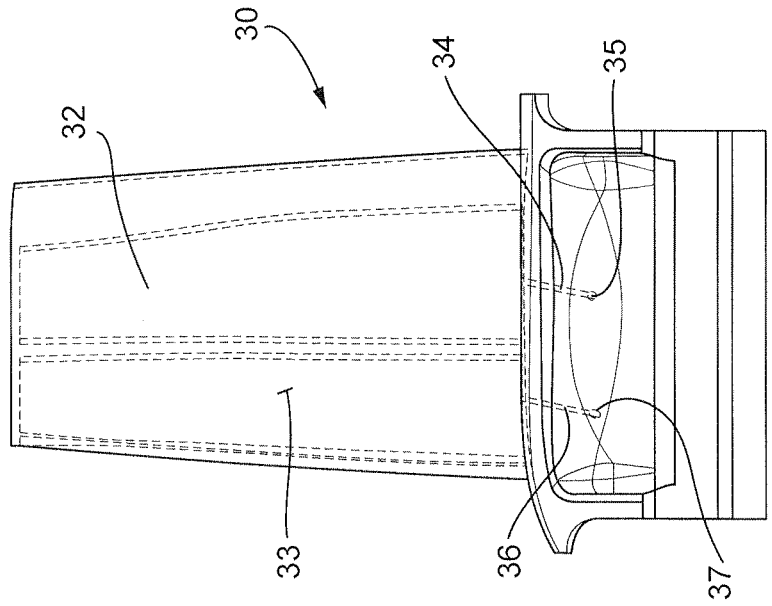
FIG. 4 is a front elevation view of the composite CMC turbine blade depicted in FIG. 2 further illustrating the alternative fluid passageways for achieving interior blade cavity pressurization.

FIG. 4 depicts a front elevation view of the CMC composite turbine blade in FIG. 2, further illustrating the fluid passageways for achieving interior blade cavity pressurization according to the invention. Fluid passageways 34 and 36 receive pressured cool air from an external source (not shown) via fluid entry points 35 and 37, which in turn feed directly into interior blade cavities 32 and 33. Again, the air flow results in a steady-state, pressurized environment inside the airfoil 30 to protect against the adverse effect of breaches to the CMC composite blade caused by high velocity exterior object impact. Interior blade cavities 32 and 33 can extend substantially the entire length of the airfoil or, alternatively, to a portion of the airfoil, thereby defining a localized blade cavity corresponding to a predicted area of potential damage to the airfoil.

Figure 5:
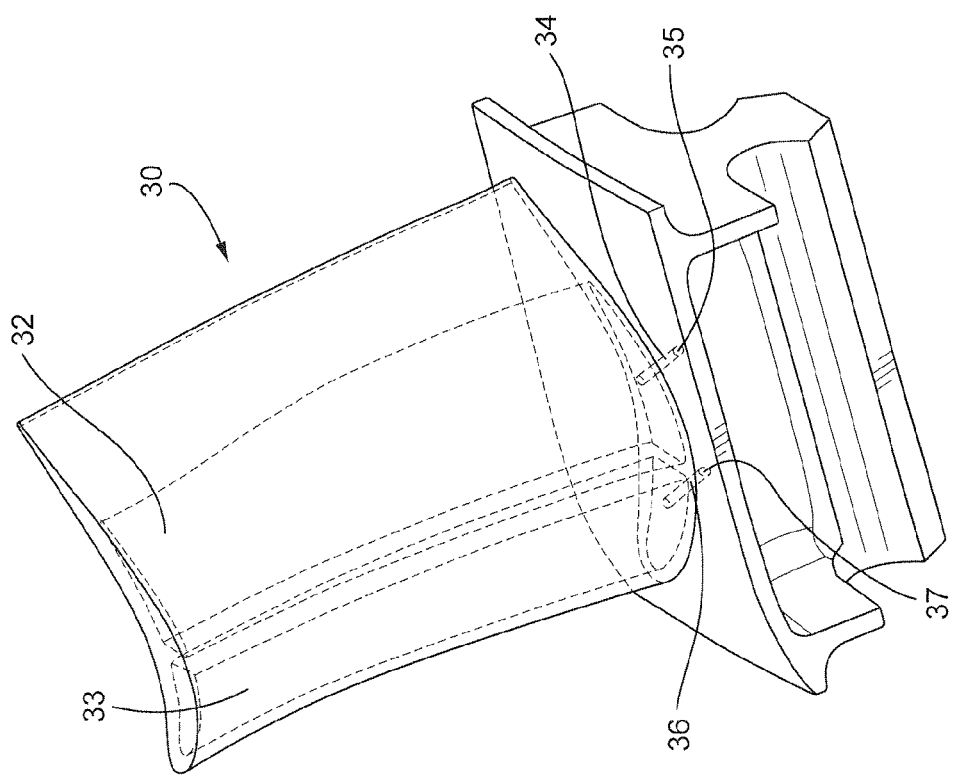
FIG. 5 is a perspective view of an exemplary CMC composite turbine blade having an integral interior blade cavity pressurization system and depicting the separate interior cavities and pressurization flow channels of the FIG. 2 embodiment.

FIG. 5 is a perspective view of an exemplary CMC composite turbine blade having the integral interior blade cavity pressurization system according to the invention depicting the separate, integral interior cavities and pressurization flow channels of the embodiment in FIG. 2. For ease of reference and clarity, the same reference numbers have been assigned to comparable blade components in FIG. 5, i.e., depicting interior fluid passageways 34 and 36 with air entry feed points 35 and 37 and with the fluid passageways feeding directly into the interior blade cavities 32 and 33.

Figure 6:
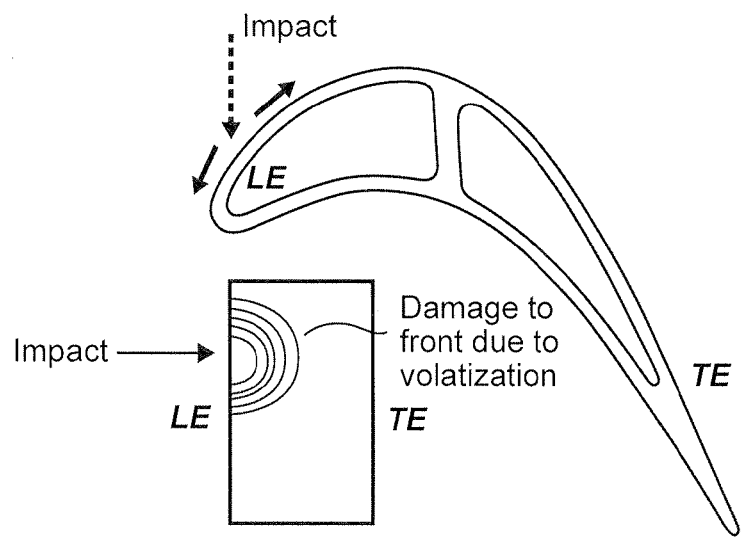
FIG. 6 depicts the cross section of a gas turbine airfoil indicating the nature and location of possible impact damage that can be contained and controlled using the pressurization system described herein.

FIG. 6 is a graphical representation of the predicted progression of hot gas path damage degradation to an uncoated CMC blade as compared to the predicted degradation using an exemplary cavity pressurization system of the invention. As the figure illustrates, the impact on the leading edge ("LE") from an exterior object results in damage to the CMC composite blade material as shown. Nominally, even assuming that a breach occurs to the interior of one of the blade cavities, the pressurized system will ensure the continued structural integrity of the blade by maintaining a substantially constant air pressure inside the cavities following an impact. In addition, the pressurization prevents any influx of water vapor into the blade interior which otherwise would accelerate blade degradation. A plurality of impact sensors can also be positioned at strategic positions on the surface of the blade leading edge, together with feedback control means to indicate the relative size and location of a breach immediately after it occurs.

Figure 7:
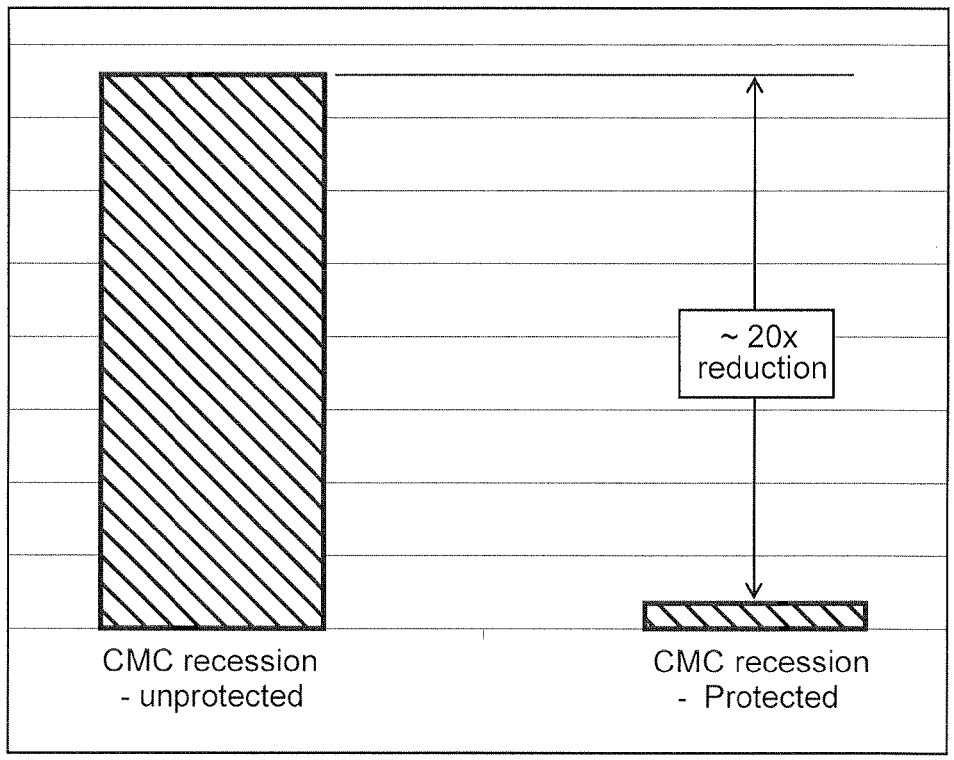
FIG. 7 is a graphical representation of the predicted progression of hot gas path damage degradation to a CMC blade as compared to the predicted degradation using the cavity pressurization system according to the invention.

FIG. 7 depicts the cross section of an exemplary gas turbine airfoil indicating the nature and location of exemplary impact damage to be contained and controlled using the pressurization systems described above. FIG. 7 compares the amount of blade degradation in the form of a breach to the CMC composite blade interior in inches to the corresponding predicted amount of hot gas path degradation, ranging from a degradation amount that is only a fraction of the maximum possible degradation of an opening along the leading edge of the CMC blade, i.e., the area of potential damage without the benefit of an interior fluid cavity pressurization system according to the invention. FIG. 7 thus shows the general orders of magnitude of increased recession of the CMC material as the hot gas path degradation continues over time. The amount of CMC degradation steadily increases as the unit continues to operate until the opening becomes so large as to create the potential for catastrophic blade failure. As FIG. 7 illustrates, the unprotected CMC recession could be up to 20 times greater than a recession protected by the new fluid cavity pressurization described above.

FIG. 7 also provides a direct comparison to the compressed air leakage degradation that can be anticipated over time following an impact, and thus illustrates how the invention protects against otherwise inevitable increases in blade degradation and ensures that the gas turbine engine can continue to operate until a normal maintenance shutdown occurs.

Figure 8:
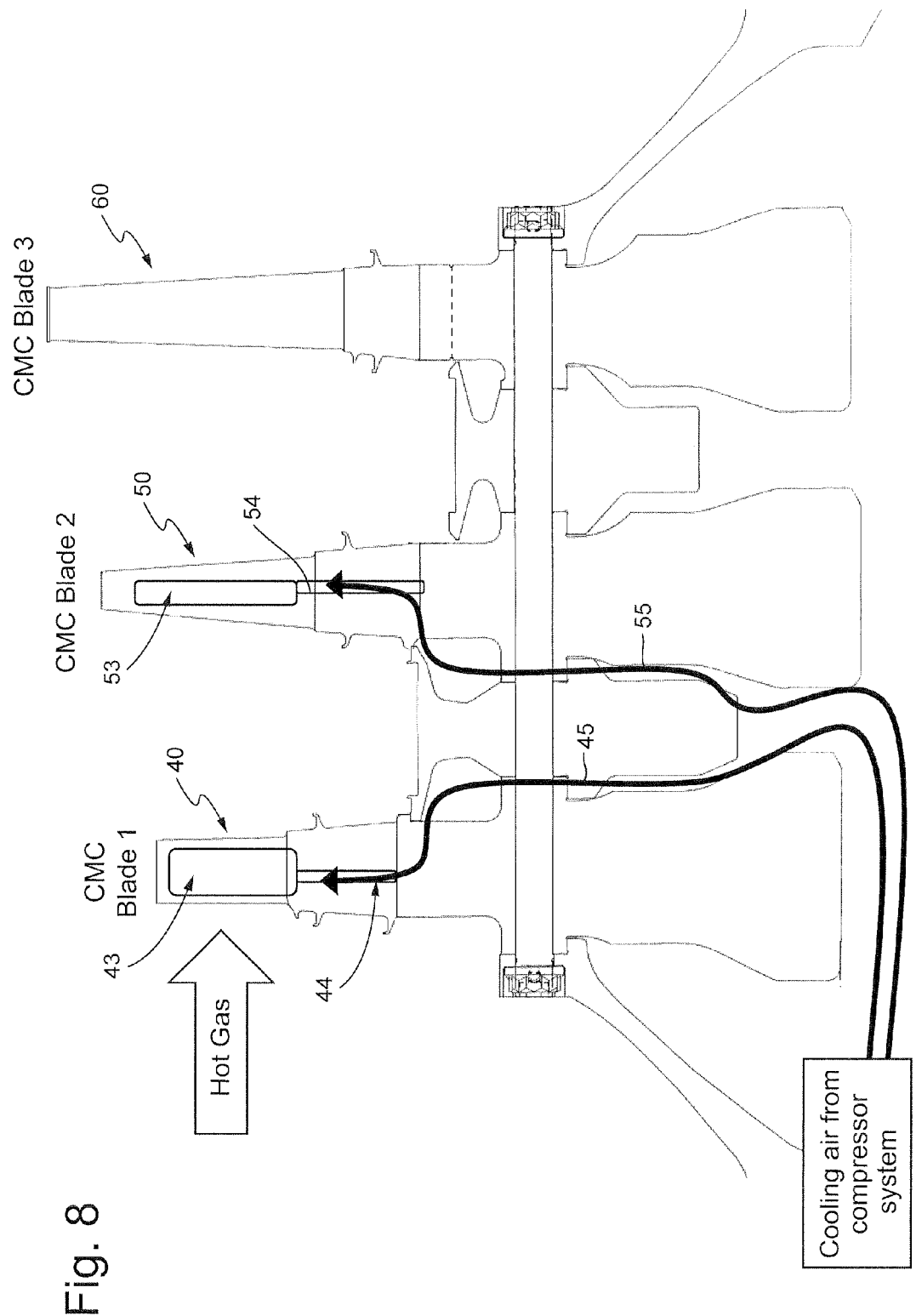
FIG. 8 is a simplified process flow diagram for achieving the desired level of pressurization of CMC composite blades in a gas turbine engine according to the invention.

FIG. 8 is a simplified process flow diagram for achieving the desired level of pressurization of CMC composite blades in a gas turbine engine. Cooling air supplied by an external air compressor system feeds directly into the individual blade cavities 43 and 53 in CMC composite blades 40, 50 and 60 in the manner described above, in this case using interior flow passages 44 and 54 from the compressor system through air feed lines 45 and 55, respectively. FIG. 8 also shows the general direction of hot gas flow into the leading edges of blade cavities 43 and 53. As noted above, in the absence of a breach to the integrity of the blade, the air being used to pressurize blade cavity will not flow into the turbine exhaust during normal operation.

Figure 9:
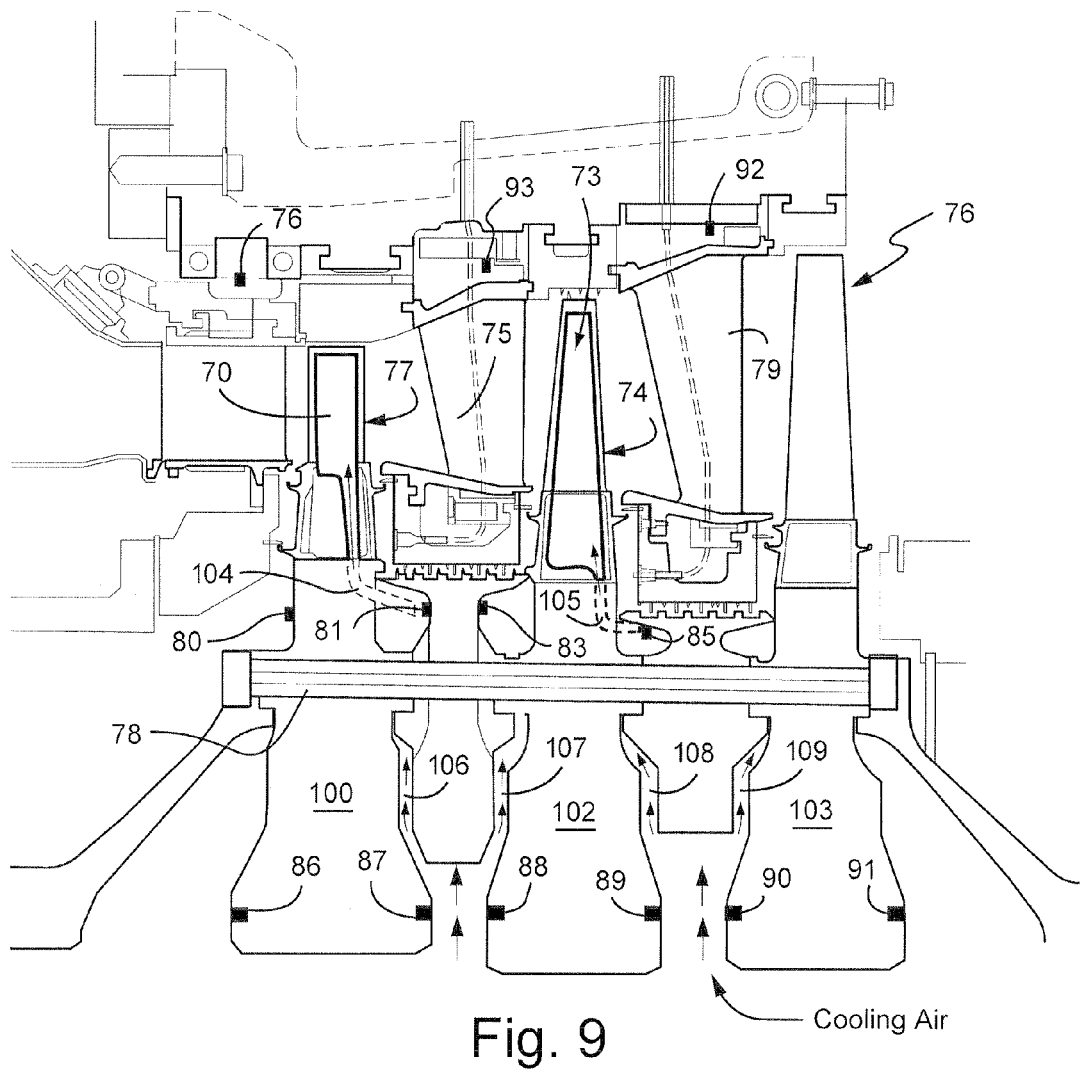
FIG. 9 is a cross-sectional view of an exemplary gas turbine rotor assembly depicting a nominal flow profile for use with the internal cavity pressure system described in connection with other figures, particularly FIGS. 3-5 and 8, and illustrating the use of exemplary pressure transducers positioned at different locations within a rotor assembly.

FIG. 9 is a cross-sectional view of a gas turbine rotor assembly depicting the flow profile using an exemplary pressure system according to the invention as described above in connection with FIGS. 3-5 and 8. FIG. 9 also depicts the location of pressure transducers used to detect the location of a breach in the structural integrity of an airfoil.

The embodiment of FIG. 9 includes a plurality of circumferentially-spaced hollow CMC matrix blades (shown by way of example as rotor airfoils 74 and 77), each of which includes one or more interior cavities capable of being protected as described above, i.e., with pressurized interior rotor airfoil cavities 70 and 73 depicted below stator blades 75 and 79. Each of the rotor airfoils connects directly to a corresponding shank, with the lower blade section coupled to plenum 78.

A typical rotor assembly such as that shown in FIG. 9 also includes first, second and third stage wheel disks as shown, by way of example, as wheel disks 100, 102 and 103, with spacers between disks and the rotor blades fitted to the outer peripheries of a corresponding wheel disk. Once installed, the wheel disks and rotor blades define a series of fluid passages 106, 107, 108 and 109 sufficient in size to accommodate pressurized, cool air being fed to the individual blades as described above in connection with FIGS. 3-5. The pressurized air passes through the fluid passages into and through air channels 104 and 105 formed between the fluid passages and inner walls of the blade interior cavities.

FIG. 9 also shows the locations of exemplary pressure transducers positioned at various locations within the rotor assembly for purposes of determining the existence and extent of any breach to the integrity of one or more airfoil interiors. The pressure transducers are installed at rotor assembly positions 80, 81, 83 and through 91 as shown (generally at or near the pressurization circuit itself), as well as stator pressure transducer positions 76, 92 and 93. Together, the transducers provide continuous feedback data regarding a breach of one or more individual airfoils at the locations indicated.

In operation, the static (non-flowing) air pressure inside the airfoils, e.g., rotor blade cavities 70 and 73, will remain constant and at a steady state condition until a breach occurs due to an impact event. If a significant breach occurs, i.e., sufficient in magnitude to reduce the cavity pressure a predetermined amount, the pressure signals at the transducers will change accordingly. As indicated above, a significant failure due to an object impact on the airfoil, if left undetected, creates a significant risk of collateral damage to the entire engine. Thus, if a failure of the interior cavity occurs along the airfoil profile, cooling fluid will flow out of the airfoil through the breach, decreasing the static pressure. The term "breach" in this context denotes a fluid flow path that is not part of the as-designed component.

An exemplary system for detecting a failure of an airfoil thus includes one or more sensors that provide signals responsive to a condition of flow of cooling fluid out of an airfoil cavity as compared to a static, steady-state pressure. A combination of sensors may be used and include devices capable of measuring flow, fluid velocity, dynamic pressure, static pressure, temperature or other parameters responsive to a condition of fluid flowing out of an airfoil cavity. Pressure transducers useful in practicing the invention include those available from Sensonetics, such as the SEN-400 "Melt Pressure Transducer" manufactured using silicon-on-Sapphire technology having a frequency response of about 4,000 HZ, normally with an infinite resolution, sapphire wetted material and adaptable for use in variable pressure ranges. Other examples of acceptable transducers include, but are not limited to, Pitot tubes, static tubes, 5-hole probes, hot wire anemometers, static pressure sensors and dynamic pressure sensors.

The system depicted in FIG. 9 will also normally include a data storage device such as a hard drive or solid-state memory for storing executable instructions in the form of a computer code capable of correlating any detected change in pressure transducer signals and report a condition of failure of a specific airfoil cavity. A central processing unit operative with the computer code correlates the change in signals resulting from a breach due to object impact. The computer code may initiate further process steps to identify the exact breach location, such as at the leading edge or other locations with external pressure loads on the airfoil. An output device responsive to the output signals provides an indication of the condition of failure, such as a warning light, an acoustic warning signal or a warning message in a data recorder.

Figure 10:
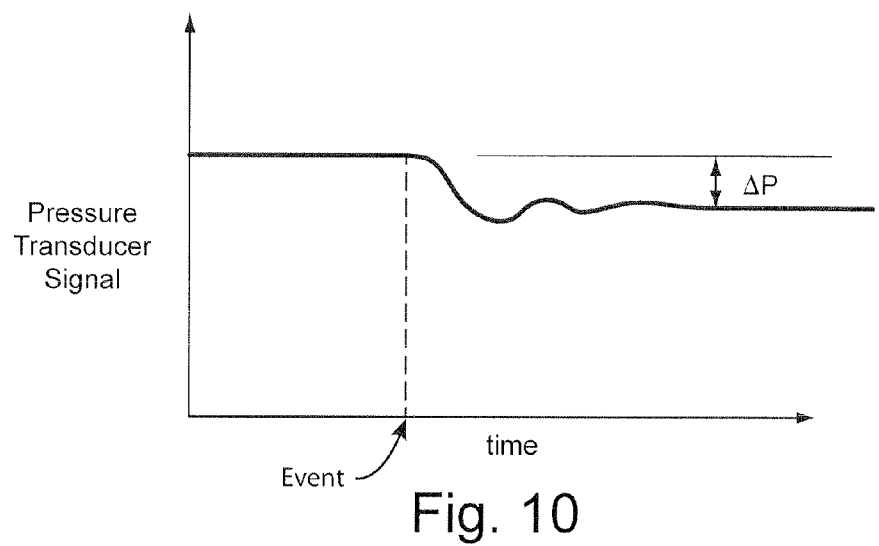
FIG. 10 is a graphical representation of an interior cavity pressure signal recorded over time as the gas turbine engine continues to operate and illustrating a potential failure mode for a given turbine blade after a breach occurs due to object impact.

Finally, FIG. 10 is a graphical representation of a typical plot of an interior cavity pressure signal plotted over time as the gas turbine engine continues to operate and illustrates a potential failure mode for a given airfoil. Normally, several pressure transducers are located within the same circuit. FIG. 10 also illustrates that when a particular pressure differential is detected (labeled "Event"), an alarm signal will be generated due to increased cooling flow through the circuit as noted above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine blade for use in a gas turbine engine, comprising:
   an airfoil comprised of a ceramic matrix composite material, said airfoil including a leading edge and trailing edge and having pressure and suction side surfaces;
   a blade shank secured to a lower end of said airfoil;
   one or more interior cavities disposed within said airfoil, each of said one or more interior cavities being a dead end and having an inlet passage in fluid communication with said blade shank;
   one or more passageways formed in a lower end of said blade shank corresponding to each one of said interior cavities; and
   a gas pump for continuously providing a source of pressurized gas to each one of said interior gas cavities in said airfoil.

2. The turbine blade according to claim 1, wherein said one or more interior gas cavities extend from the lower end of said airfoil toward a tip of the airfoil.

3. The turbine blade according to claim 1, wherein said one or more interior gas cavities extend at least a portion a length of said airfoil to define a localized cavity corresponding to a predicted area of airfoil damage.

4. The turbine blade according to claim 1, wherein each of said one or more interior gas cavities is pressurized by air.

5. The turbine blade according to claim 4, wherein each of said one or more interior gas cavities is pressurized by air with a water content that is less than a water content of external air.

6. The turbine blade according to claim 1, wherein said blade shank includes a dovetail connection for assembly onto a turbine rotor wheel with other blades to form a circumferential array.

7. The turbine blade according to claim 1, wherein each of said one or more interior cavities is maintained at a prescribed air pressure and temperature.

8. The turbine blade according to claim 1, wherein said source of pressurized gas is sufficient in pressure and volume to maintain a minimum gas flow to each of said one or more interior cavities in the event of a breach of one or more of said cavities due to foreign object damage.

9. The turbine blade according to claim 1, wherein said airfoil comprises a preform of a ceramic fiber.

10. The turbine blade according to claim 9, wherein said preform comprises silicon carbide.

11. The turbine blade according to claim 1, wherein said gas passageways formed in the lower end of said blade shank extend from a bottom edge of said dovetail up through said blade shank and into said interior cavities.

12. The method of manufacturing a turbine blade for use in a gas turbine engine, comprising:
 a. forming an airfoil comprised of a ceramic composite material;
 b. forming one or more interior cavities within said airfoil, wherein each of said one or more interior cavities is a dead end and includes an inlet passage in fluid communication with said blade shank;
 c. providing pressurized gas to each of said one or more interior cavities in said airfoil by fluidly coupling each of the inlet passages to a source of the pressurized gas, and
 d. continuously applying the pressurized gas to each of said interior cavities from the source, wherein the pressurized gas is stagnant within each of the one or more interior cavities.

13. The method according to claim 12, wherein said step of forming an airfoil further includes preparing a preform using a silicon carbide ceramic fiber and weaving said fiber into the desired airfoil shape.

14. The method according to claim 13, wherein said step of preparing a preform further includes the step of infiltrating said preform with a matrix material.

15. The method according to claim 14, wherein said preform is coated for bonding with said matrix material using chemical vapor infiltration, slurry infiltration-sintering, slurry casting or melt infiltration.

16. The method according to claim 12, wherein said step of providing a pressurized gas is sufficient in to maintain a minimum gas flow to each of said interior gas cavities in the event of a breach of one or more of said cavities due to foreign object damage.

17. An apparatus for detecting a failure of a turbine blade in a gas turbine engine, the turbine blade comprising a ceramic matrix composite material airfoil including an outer surface, an inner cooling chamber and passages, the apparatus comprising:
 continuously applying a pressurized cooling gas to the inner cooling chamber and the passages which dead end in said airfoil, wherein the inner cooling chamber and passages are in fluid communication with a source of the pressurized cooling gas;
 maintaining a substantially constant static pressure in the inner cooling chamber and the passages by the continuous application of the pressurized cooling gas and due to the inner cooling chamber and the passages dead ending in the airfoil;
 one or more pressure transducers providing signals responsive to a change in the static pressure of the pressurized cooling gas in the cooling chamber and passages of said airfoil;
 a non-transitory storage device storing a computer code configured to correlate changes in said signals to indicate a change in the static pressure in the cooling chamber and passages of the airfoil;
 a processing unit operative with the computer code to configured to determine whether said changes in signals indicates a breach condition in the inner cooling chamber or the passages of said airfoil; and
 an output device providing an indication of at least one of said changes in the static pressure and the breach condition.

18. The apparatus according to claim 17, wherein said pressure transducers provide data indicating an extent of said change in pressure inside said airfoil.

19. The apparatus according to claim 17, wherein said output device comprises a warning light, an acoustic warning signal or warning message in a data recorder.

* * * * *

UNITED STATES PATENT AND TRADEMARK OFFICE
CERTIFICATE OF CORRECTION

| | | |
|---|---|---|
| PATENT NO. | : 9,249,669 B2 | Page 1 of 1 |
| APPLICATION NO. | : 13/439892 | |
| DATED | : February 2, 2016 | |
| INVENTOR(S) | : Garcia-Crespo et al. | |

It is certified that error appears in the above-identified patent and that said Letters Patent is hereby corrected as shown below:

In the specification,

At column 5, lines 17-18, insert --16-- after "includes integral platform"

At column 7, line 43, change "at rotor assembly positions 80, 81, 83 and through 91" to --at rotor assembly positions 80, 81, 83 and 85 through 91--

Signed and Sealed this
Third Day of May, 2016

Michelle K. Lee
*Director of the United States Patent and Trademark Office*